United States Patent
Jereczek et al.

(10) Patent No.: US 11,469,915 B2
(45) Date of Patent: Oct. 11, 2022

(54) TECHNOLOGIES FOR SHARING PACKET REPLICATION RESOURCES IN A SWITCHING SYSTEM

(71) Applicant: INTEL CORPORATION, Santa Clara, CA (US)

(72) Inventors: Grzegorz Jereczek, Gdansk (PL); Amruth Gouda Parameshwarappa, San Jose, CA (US); Christopher Edmiston, Austin, TX (US); Maciej Andrzej Koprowski, Gdansk (PL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/975,928

(22) PCT Filed: Jun. 12, 2018

(86) PCT No.: PCT/PL2018/000059
§ 371 (c)(1),
(2) Date: Aug. 26, 2020

(87) PCT Pub. No.: WO2019/240602
PCT Pub. Date: Dec. 19, 2019

(65) Prior Publication Data
US 2020/0412563 A1 Dec. 31, 2020

(51) Int. Cl.
*H04L 12/18* (2006.01)
*H04L 49/00* (2022.01)

(52) U.S. Cl.
CPC ...... *H04L 12/1886* (2013.01); *H04L 49/3009* (2013.01)

(58) Field of Classification Search
CPC ............ H04L 12/1886; H04L 12/4633; H04L 12/4645; H04L 49/3009; H04L 67/1095
See application file for complete search history.

(56) References Cited

U.S. PATENT DOCUMENTS 9,240,898 B1  1/2016 Melman
9,858,442 B1 * 1/2018 Takahashi ............... H04L 9/083
(Continued)

FOREIGN PATENT DOCUMENTS

WO  WO2016122562  8/2016
WO  WO2016122570  8/2016

OTHER PUBLICATIONS

PCT Search Report and Written Opinion prepared for PCT/PL2018/000059, completed Jan. 24, 2019.
(Continued)

*Primary Examiner* — Mohamed A. Wasel
(74) *Attorney, Agent, or Firm* — Compass IP Law PC (57) ABSTRACT

Technologies include a network switch configured to perform packet replication. The network switch includes a network communicator, an entity manager, and a tag manager. The network communicator is to receive a data packet, and the entity manger is to identify an entity associated with the data packet and determine a tag associated with the entity. Additionally, the tag manager is to determine a packet replication configuration associated with the tag, and perform one or more per-port forwarding actions based on the packet replication configuration. The packet replication configuration includes one or more destination ports to be masked and a number of copies to be replicated to be sent out on of at least one destination port.

18 Claims, 6 Drawing Sheets

(56) References Cited

U.S. PATENT DOCUMENTS

| 2009/0083536 | A1* | 3/2009 | Weis | H04L 12/1886 |
| | | | | 713/153 |
| 2015/0281099 | A1* | 10/2015 | Banavalikar | H04L 12/4641 |
| | | | | 370/230 |
| 2018/0343137 | A1* | 11/2018 | Van De Velde | H04L 47/15 |
| 2020/0374205 | A1* | 11/2020 | Sharma | H04L 67/12 |

OTHER PUBLICATIONS

Salsano et al., "Information centric networking over SDN and OpenFlow: Architectural aspects and experiments on the OFELIA testbed" (2013).

* cited by examiner

TECHNOLOGIES FOR SHARING PACKET REPLICATION RESOURCES IN A SWITCHING SYSTEM

CROSS REFERENCE TO RELATED APPLICATIONS

The present application is a national stage entry under 35 USC § 371(b) of International Application No. PCT/PL2018/000059, filed Jun. 12, 2018.

BACKGROUND

A network switch is a computing networking device that is generally used to connect multiple source devices on a computer network using packet switching to receive, process, and forward data to one or more destination devices. For example, the network switch may be used for analyzing and processing packet data for routing and switching packets in a variety of applications, such as network surveillance, video transmission, protocol conversion, voice processing, and internet traffic routing. To do so, the network switch includes hardware resources that are used by different entities within and across a number of functionalities, for example, per-port forwarding, multicast, flooding, load balancing, and link aggregation. Typically, each instantiation of a packet forwarding event has its own assigned hardware resources, which may result in an increase in resource consumption. Capabilities of available hardware resources may limit efficiency of network switch performance.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
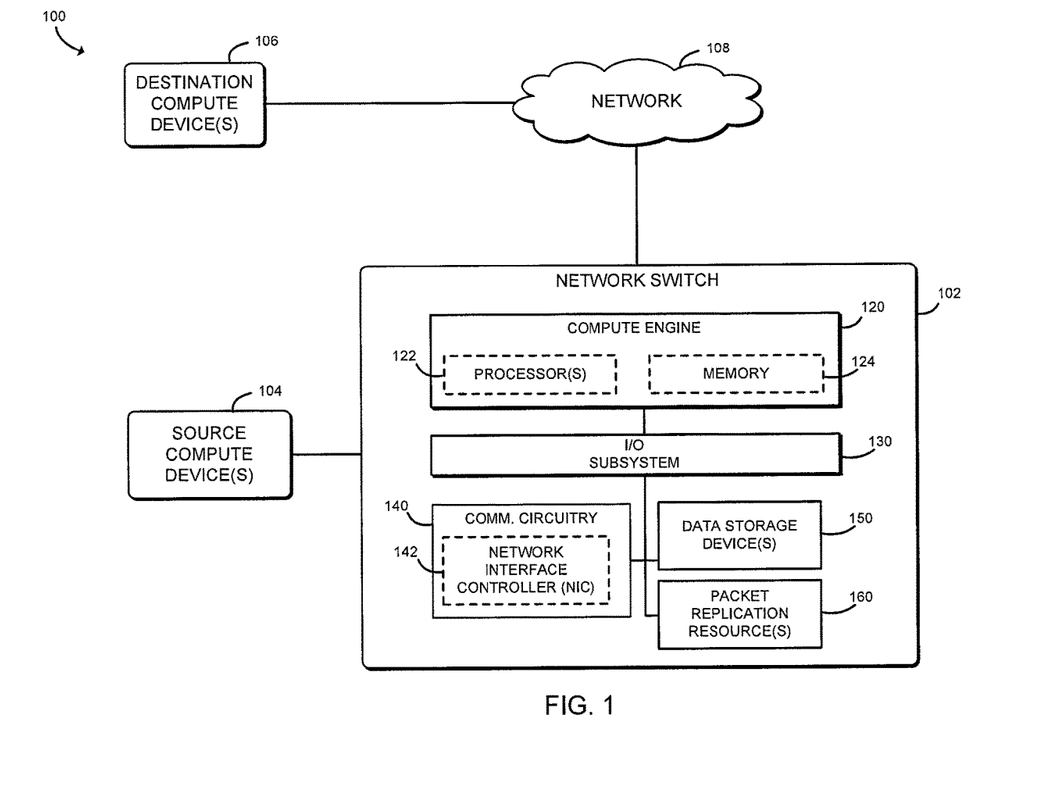
FIG. 1 is a simplified block diagram of at least one embodiment of a switching system that includes a network switch for sharing packet replication resources to forward packets.

Referring now to FIG. 1, an illustrative system 100 for sharing packet replication resources includes a network switch 102, one or more source compute devices 104, and one or more destination devices 106. In use, the network switch 102 is configured to receive a data packet from a source compute device 104 that is to be transmitted to one or more destination compute devices 106. To do so, the network switch 102 may determine a packet replication scheme associated with the data packet. The packet replication scheme may be configured to optimize packet replication resource use, maximize throughput, minimize response time, and avoid overload of any single packet replication resource. For example, the packet replication scheme may include multicasting, flooding, load balancing, and other network routing algorithms. In the illustrative embodiment, the network switch 102 may create an entity for each instantiation of a packet replication scheme and assign a set of packet replication resources to be used to forward a packet associated with the entity. It should be appreciated that the packet replication resources may be shared between multiple entities. In the illustrative embodiment, the packet replication resources are hardware resources that store destination port masks and per port packet replication information. In the illustrative embodiment, the hardware resources are embodied as static random access memory (SRAM).

For example, a user may request the network switch 102 to create an entity that requires a set of packet replication resources to apply an associated particular packet replication scheme. The data packet received from the source computing device 104 may include an entity identifier indicative of a set of packet replication resources. For example, the data packet received from source computing device 104 may be processed by routing or switching algorithms, which may lead the data packet to an entity using packet replication resources. Additionally, each entity identification number is associated with a tag identifier for a replication configuration for a single data packet, wherein the packet replication configuration indicates where and how many copies of the received data packet are to be sent out. For example, the tag identifier includes a destination port mask indicative of which ports a packet should be sent out on and a replication group indicative of how many copies of a packet should be sent out on each destination port. It should be appreciated that each tag may be associated with multiple entities.

The network switch 102 may be embodied as any type of computing device capable of facilitating wired and/or wireless network communications between the source compute device(s) 104 and the destination compute device(s) 106. For example, the network switch device 102 may be embodied as a server (e.g., stand-alone, rack-mounted, blade, etc.), a router, a switch, a network hub, an access point, a storage device, a compute device, a multiprocessor system, a network appliance (e.g., physical or virtual), a computer, a desktop computer, a smartphone, a workstation, a laptop computer, a notebook computer, a tablet computer, a mobile computing device, or any other computing device capable of processing network packets.

The source compute device(s) 104 may be embodied as any type of computation or computing device capable of performing the functions described herein, including, without limitation, a computer, a desktop computer, a smartphone, a workstation, a laptop computer, a notebook computer, a tablet computer, a mobile computing device, a wearable computing device, a network appliance, a web appliance, a distributed computing system, a processor-based system, and/or a consumer electronic device. Similarly, the destination compute device(s) 106 may be embodied as any type of computation or computing device capable of performing the functions described herein, including, without limitation, a computer, a desktop computer, a smartphone, a workstation, a laptop computer, a notebook computer, a tablet computer, a mobile computing device, a wearable computing device, a network appliance, a web appliance, a distributed computing system, a processor-based system, and/or a consumer electronic device. Each of the source compute device(s) 104 and the destination compute device(s) 106 may include components commonly found in a computing device such as a processor, memory, input/output subsystem, data storage, communication circuitry, etc.

The network 108 may be embodied as any type of wired or wireless communication network, including cellular networks (e.g., Global System for Mobile Communications (GSM), 3G, Long Term Evolution (LTE), Worldwide Interoperability for Microwave Access (WiMAX), etc.), digital subscriber line (DSL) networks, cable networks (e.g., coaxial networks, fiber networks, etc.), telephony networks, local area networks (LANs) or wide area networks (WANs), global networks (e.g., the Internet), or any combination thereof. Additionally, the network 108 may include any number of network devices (e.g., the network switches 102) as needed to facilitate communication between the network switch 102, the source compute device(s) 104, and the destination compute device(s) 106. Although the network switch 102 is shown in FIG. 1 to directly communicate with the source computing devices 104, in some embodiments, the network switch 102 and the source compute devices 104 may communicate via the network 108.

The network switch 102 may be embodied as any type of compute device capable of performing the functions described herein, including receiving data packets from one or more source compute devices 104, creating entities, associating a tag to one or more entities, determining a set of packet replication resources to be used to forward a packet associated with an entity, determining a packet replication configuration associated with a data packet, updating the tag based on a packet replication configuration associated with a data packet, and forwarding a data packet to one or more destination computing devices 106 using a set of packet replication resources associated with a tag. As shown in FIG. 1, the illustrative network switch 102 includes a compute engine 120, an input/output (I/O) subsystem 130, communication circuitry 140, one or more data storage devices 150, and one or more packet replication resources 160. It should be appreciated that, in other embodiments, the network switch 102 may include other or additional components, such as those commonly found in a computer (e.g., peripheral devices). Additionally, in some embodiments, one or more of the illustrative components may be incorporated in, or otherwise form a portion of, another component.

The compute engine 120 may be embodied as any type of device or collection of devices capable of performing various compute functions described below. In some embodiments, the compute engine 120 may be embodied as a single device such as an integrated circuit, an embedded system, a field-programmable gate array (FPGA), a system-on-a-chip (SoC), or other integrated system or device. In the illustrative embodiment, the compute engine 120 includes or is embodied as one or more processors 122 and a memory 124. The processor 122 may be embodied as any type of processor capable of performing the functions described herein. For example, the processor 122 may be embodied as a single or multi-core processor(s), a microcontroller, or other processor or processing/controlling circuit. In some embodiments, the processor 122 may be embodied as, include, or be coupled to an FPGA, an application specific integrated circuit (ASIC), reconfigurable hardware or hardware circuitry, or other specialized hardware to facilitate performance of the functions described herein.

The memory 124 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4 (these standards are available at www.jedec.org). Such standards (and similar standards) may be referred to as DDR-based standards and communication interfaces of the storage devices that implement such standards may be referred to as DDR-based interfaces.

In one embodiment, the memory device is a block addressable memory device, such as those based on NAND or NOR technologies. A memory device may also include future generation nonvolatile devices, such as a three dimensional crosspoint memory device (e.g., Intel 3D XPoint™ memory), or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product. In the illustrative embodiment, the memory includes static random access memory (SRAM).

The compute engine 120 is communicatively coupled to other components of the network switch 102 via the I/O subsystem 130, which may be embodied as circuitry and/or components to facilitate input/output operations with the compute engine 120 (e.g., with the processor 122 and/or the memory 124) and other components of the network switch 102. For example, the I/O subsystem 130 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 130 may form a portion of a system-on-a-chip (SoC) and be incorporated, along with one or more of the processor 122, the memory 124, and other components of the network switch 102, into the compute engine 120.

The communication circuitry 140 may be embodied as any communication circuit, device, or collection thereof, capable of enabling communications between the network switch 102 and another compute device (e.g., the source compute devices 104 and the destination compute devices 106). The communication circuitry 140 may be configured to use any one or more communication technology (e.g., wired or wireless communications) and associated protocols (e.g., Ethernet, Bluetooth®, Wi-Fi®, WiMAX, etc.) to effect such communication. The communication circuitry 140 may include a network interface controller (NIC) 142 (e.g., as an add-in device), which may also be referred to as a port logic. The NIC 142 may be embodied as one or more add-in-boards, daughter cards, network interface cards, controller chips, chipsets, or other devices that may be used by the compute device 102 to connect with another compute device (e.g., the source compute devices 104 and the destination compute devices 106). In some embodiments, the NIC 142 may be embodied as part of a system-on-a-chip (SoC) that includes one or more processors, or included on a multichip package that also contains one or more processors. In some embodiments, the NIC 142 may include a local processor (not shown) and/or a local memory (not shown) that are both local to the NIC 142. In such embodiments, the local processor of the NIC 142 may be capable of performing one or more of the functions of the compute engine 120 described herein. Additionally or alternatively, in such embodiments, the local memory of the NIC 142 may be integrated into one or more components of the network switch 102 at the board level, socket level, chip level, and/or other levels.

The one or more illustrative data storage devices 150 may be embodied as any type of devices configured for short-term or long-term storage of data such as, for example, memory devices and circuits, memory cards, hard disk drives, solid-state drives, or other data storage devices. Each data storage device 150 may include a system partition that stores data and firmware code for the data storage device 150. Each data storage device 150 may also include one or more operating system partitions that store data files and executables for operating systems.

The network switch 102 may also include one or more packet replication resources 160 which may be embodied as any device or circuitry (e.g., a processor, a co-processor, an FPGA, an ASIC, etc.) capable of receiving data packets from one or more source compute devices 104, creating entities, associating a tag to one or more entities, determining a set of packet replication resources to be used to forward a packet associated with an entity, determining a packet replication configuration associated with a data packet, updating the tag based on a packet replication configuration associated with a data packet, forwarding a data packet to one or more destination computing devices 106 using a set of packet replication resources associated with a tag.

Figure 2:
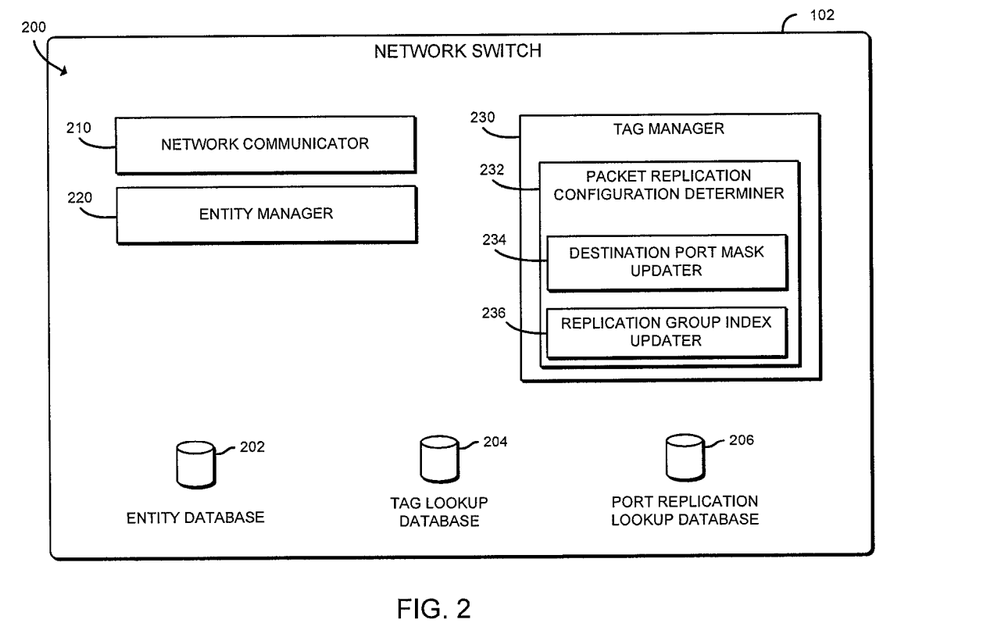
FIG. 2 is a simplified block diagram of at least one embodiment of an environment that may be established by the network switch of the switching system of FIG. 1.

Referring now to FIG. 2, in the illustrative embodiment, the network switch 102 may establish an environment 200 during operation. The illustrative environment 200 includes a network communicator 210, an entity manager 220, and a tag manager 230, which includes a packet replication configuration determiner 232. The packet replication configuration determiner 232 further includes a destination port mask updater 234 and a replication group index updater 236. Each of the components of the environment 200 may be embodied as hardware, firmware, software, or a combination thereof. As such, in some embodiments, one or more of the components of the environment 200 may be embodied as circuitry or a collection of electrical devices (e.g., network communicator circuitry 210, entity manager circuitry 220, tag manager circuitry 230, packet replication configuration determiner circuitry 232, destination port mask updater circuitry 234, replication group index updater circuitry 236, etc.). It should be appreciated that, in such embodiments, one or more of the network communicator circuitry 210, the entity manager circuitry 220, the tag manager circuitry 230, the packet replication configuration determiner circuitry 232, the destination port mask updater circuitry 234, and/or the replication group index updater circuitry 236 may form a portion of a the compute engine 120 (e.g., one or more of the processor(s) 122, the memory 124), the I/O subsystem 130, the packet replication resources 160, and/or other components of the network switch 102.

The network switch 102 further includes an entity database 202, a tag lookup database 204, and a port replication lookup database 206. The entity database 202 includes mappings between the entities and the tags. The entity database 202 may be used to determine, in response to receiving a data packet from a source compute device 104, whether an entity identifier identified by the data packet is already defined. The tag lookup database or table 204 includes mappings between the tags and one or more corresponding destination port masks for each tag to identify one or more destination computing devices 106 that a packet is to be forwarded to. The destination port mask may be embodied as a binary bit mask indicating which destination ports a packet should be sent out on. The binary bit mask is data that is used for bitwise operations to set either on or off in a single bitwise operation. For example, a destination port may be set to forward a packet if a binary bit that corresponds to the destination port is masked on (e.g., masked to one). Alternatively, the destination port may be reset to not forward the packet if the binary bit is masked off (e.g., masked to zero). The port replication lookup database 206 includes mappings between the replication group indices and a corresponding replication group for each replication group index. The replication group indicates a number of copies of packet to be replication to be sent out on each destination port. It should be appreciated that the entity database 202, the tag lookup database 204, and the port replication lookup database 206 may each be embodied as a data structure (e.g., a table) stored in the memory 124 of the network switch 102, which is embodied as SRAM in the illustrative embodiment.

In the illustrative environment 200, the network communicator 210, which may be embodied as hardware, firmware, software, virtualized hardware, emulated architecture, and/or a combination thereof as discussed above, is configured to facilitate inbound and outbound network communications (e.g., network traffic, network packets, network flows, etc.) to and from the network switch 102, respectively. To do so, the network communicator 210 is configured to receive and process data from one system or computing device (e.g., the source compute devices 104, etc.) and to replicate and transmit data to a system or computing device (e.g., the destination compute devices 106, etc.). Accordingly, in some embodiments, at least a portion of the functionality of the network communicator 210 may be performed by the communication circuitry 140.

The entity manager 220, which may be embodied as hardware, firmware, software, virtualized hardware, emulated architecture, and/or a combination thereof as discussed above, is configured to manage a mapping between entities and tags and update the entity database 202. For example, the entity manager 220 is configured to determine whether an entity associated with a received packet exists in the entity database 202 based on the identified entity identifier. Additionally, the entity manager 220 is configured to determine a tag associated with a particular entity identifier associated with the received packet. Accordingly, the entity manager 220 determines whether to create a new entity, delete an old entity, associate the new entity with an existing tag, or create a new tag associated with an entity.

The tag manager 230, which may be embodied as hardware, firmware, software, virtualized hardware, emulated architecture, and/or a combination thereof as discussed above, is configured to manage one or more tags associated with one or more entities in the network switch 102. To do so, the tag manager 230 includes a packet replication configuration determiner 232. The packet replication configuration determiner 232, which may be embodied as hardware, firmware, software, virtualized hardware, emulated architecture, and/or a combination thereof as discussed above, is configured to determine a packet replication configuration associated with the tag and a packet replication configuration associated with a received data packet. Additionally, the tag manager 230 is configured to determine whether the packet replication configuration associated with the tag and the packet replication configuration associated with the data packet are different. As discussed above, the packet replication configuration indicates which destination ports (i.e., destination compute devices 108) and how many copies of the received data packet are to be sent out on each destination port. For example, the tag identifier includes a destination port mask indicative of which destination port(s) a packet should be sent out and a replication group indicative of how many copies of a packet should be sent out on each destination port. The tag manager 230 is configured to update the packet replication configuration of the tag.

To do so, as discussed above, the packet replication configuration determiner 232 includes the destination port mask updater 234 and the replication group index updater 236. The destination port mask updater 234 is configured to determine one or more destination ports to be masked based on an identified tag by using the tag lookup table 204, compare the destination port mask(s) of the tag with the destination port mask(s) of the data packet, and update the tag lookup database 204 to update the destination port mask(s) associated with the tag in accordance with the destination port mask(s) associated with the data packet.

The replication group index updater 236 is configured to map the replication group indices and the corresponding replication group for each replication group index. The replication group index updater 236 is further configured to determine a replication group index that points to the port replication lookup database 206, which indicates a number of copies of data packet to be sent out on each destination port, compare the replication group index of the tag with the replication group index of the data packet, and update the port replication lookup database 206. Additionally, the replication group index updater 236 is configured to determine a replication group using the port replication lookup table 206 based on the replication group index to determine a number of copies of data packet to be sent out on each destination port and modification information for each copy of data packet. In other words, the replication group index is a hardware index representing a single configuration of per-port replication lookup to be used to determine how many copies of a packet should be sent out on each destination port.

Figure 3:
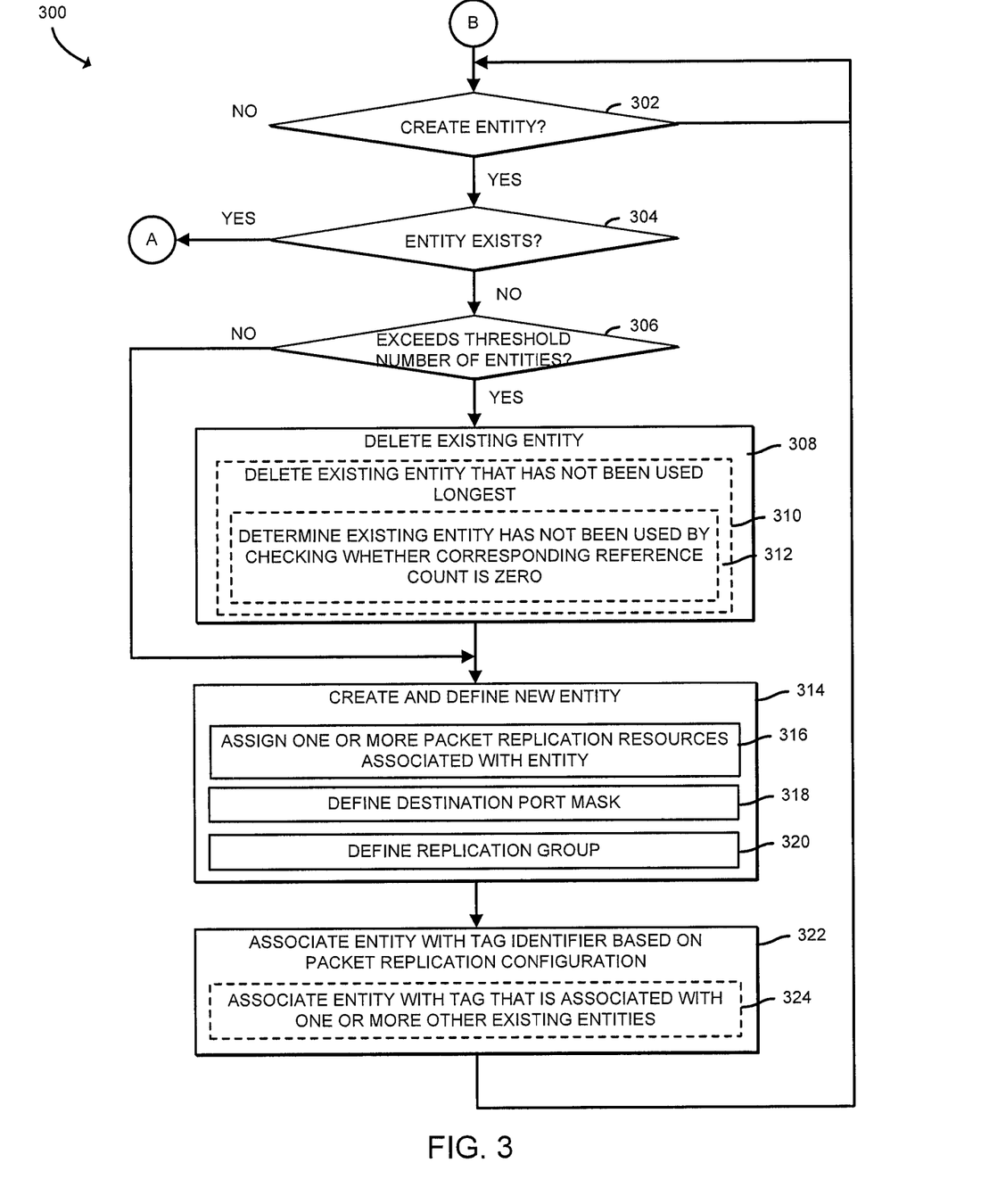
FIGS. 3 and 4 are a simplified flow diagram of at least one embodiment of a method for creating an entity prior to receiving data packets that may be executed by the network switch of FIGS. 1 and 2.
Figure 4:
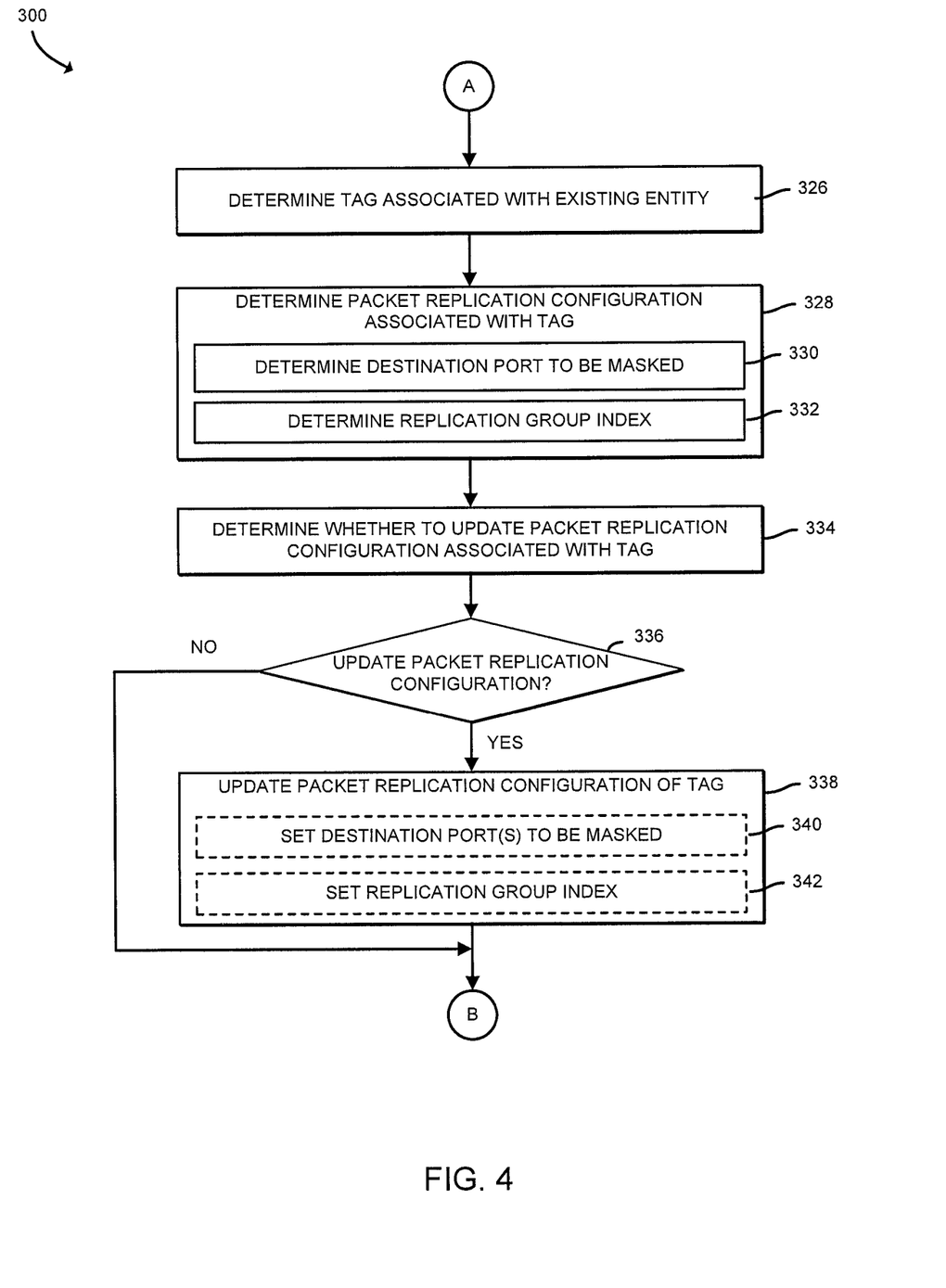

Referring now to FIGS. 3 and 4, in use, the network switch 102 may execute a method 300 for creating an entity associated with a packet replication scheme prior to receiving data packets from source compute devices 104. The method 300 begins with block 302 in which the network switch 102 determines whether to create an entity. For example, the network switch 102 may receive a request from a user to create an entity that defines a set of packet replication resources that is associated with a packet replication scheme. If the network switch 102 determines not to create an entity, the method 300 loops back to block 302 to continue determining whether to create an entity. If the network switch 102 determines to create an entity, the method 300 advances to block 304.

In block 304, the network switch 102 determines whether the entity associated with the packet replication scheme already exists. If the network switch 102 determines that the entity associated with the packet replication scheme does not exist, the method 300 advances to block 306, in which the network switch 102 determines whether a total number of existing entities exceed a threshold. If the network switch 102 determines that the total number of entities does not exceed the threshold, the method 300 skips ahead to block 314. If, however, the network switch 102 determines that the total number of entities exceeds the threshold, the method 300 advances to block 308, in which the network switch 102 deletes an existing entity. To do so, in some embodiments, the network switch 102 may delete an existing entity that has not been used the longest as illustrated in block 310. In some embodiments, the network switch 102 may determine whether an existing entity has not been used by checking a corresponding reference count. As discussed above, each entity may have a reference count that indicates whether the entity is being used (i.e., whether a packet received from a source computing device 104 includes the entity identifier associated with the entity). In other words, the reference count is used to track how often the corresponding entity is being used to determine which entity to delete in order to create a new entity. As such, in such embodiments, the network switch 102 may delete an existing entity that has a corresponding reference count of zero or the lowest reference count. Subsequently, the method 300 advances to block 314 to create an entity. However, it should be appreciated that, in some embodiments, the network switch 102 may return an error indicating that the network switch 102 is out of hardware packet replication resources to create a new entity.

In block 314, the network switch 102 defines an entity with a new entity identifier. To do so, the network switch 102 assigns a set of packet replication resources to be used to forward a packet with the entity identifier as illustrated in block 316. In the illustrative embodiment, the network switch 102 stores the entity and the associated entity identifier in the entity database 202. As discussed further below, the entity database 202 may be used to determine, in response to receiving a data packet from a source compute device 104, whether an entity identifier identified by the data packet is already defined. Subsequently, the network switch 102 defines the packet replication configuration (e.g., packet forwarding rule(s)) associated with the new entity identifier. For example, the network switch 102 defines a destination port mask to identify the destination computing devices 106 that a packet with the new entity identifier is to be forwarded to as illustrated in block 318. Additionally, in block 320, the network switch 102 defines a replication group to identify a number of copies of a packet with the new entity identifier is to be forwarded on each destination port.

Subsequently, in block 322, the network switch 102 associates the new entity identifier with a tag identifier. In some embodiments, the network switch 102 may associate the new entity identifier with a tag that is associated with one or more other existing entities as illustrated in block 324. For example, if the set of packet replication resources assigned to the new entity is already associated with an existing tag identifier, the network switch 102 may associate the new entity with the existing tag identifier. The network switch 102 may create a new tag identifier if the network switch 102 cannot find an existing tag identifier that satisfies the packet replication resource requirements of the new entity. Subsequently, the method 300 loops back to block 302 to continue determining whether to create an entity.

Referring back to block 304, if the network switch 102 determines that the entity associated with the packet replication scheme already exists, the method 300 skips ahead to block 326 of FIG. 4. In block 326, the network switch 102 determines a tag associated with the existing entity based on the entity database 202. Subsequently, the network switch 102 determines a packet replication configuration associated with the tag as illustrated in blocks 328-332. As described above, the packet replication configuration includes one or more destination ports to be masked and a replication group index indicating one or more destination computing devices 106 and a number of copies of a packet to be forwarded to each destination computing device 106, respectively.

Subsequently, in block 334, the network switch 102 determines whether to update the packet replication configuration associated with the tag. If, the network switch 102 determines not to update the packet replication configuration in block 336, the method 300 loops back to block 302 to continue determining whether to create an entity.

If, however, the network switch 102 determines to update the packet replication configuration in block 336, the method 300 advances to block 338. In block 338, the network switch 102 updates the packet replication configuration associated with the tag. In some embodiments, the network switch 102 may set one or more destination ports to be masked to modify the destination computing devices 106 that a packet with the existing entity identifier is to be forwarded to as illustrated in block 340. Additionally or alternatively, the network switch 102 may set the replication group index to modify a number of copies of a packet with the existing entity identifier that is to be forwarded on each destination port as illustrated in block 342. Subsequently, the method 300 loops back to block 302 to continue determining whether to create an entity.

Figure 5:
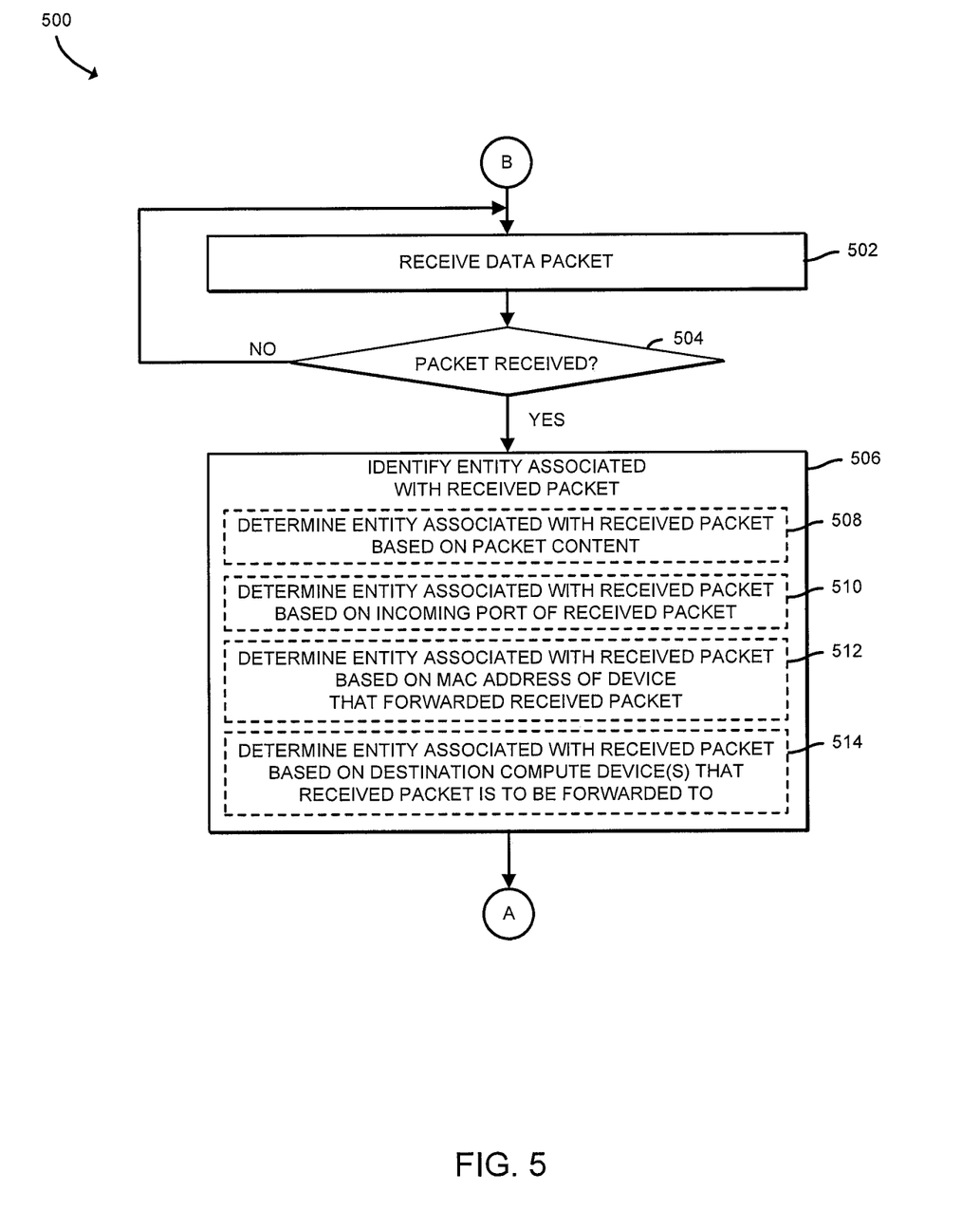
FIGS. 5 and 6 are a simplified flow diagram of at least one embodiment of a method for sharing packet replication resources to forward received data packet that may be executed by the network switch of FIGS. 1 and 2.
Figure 6:
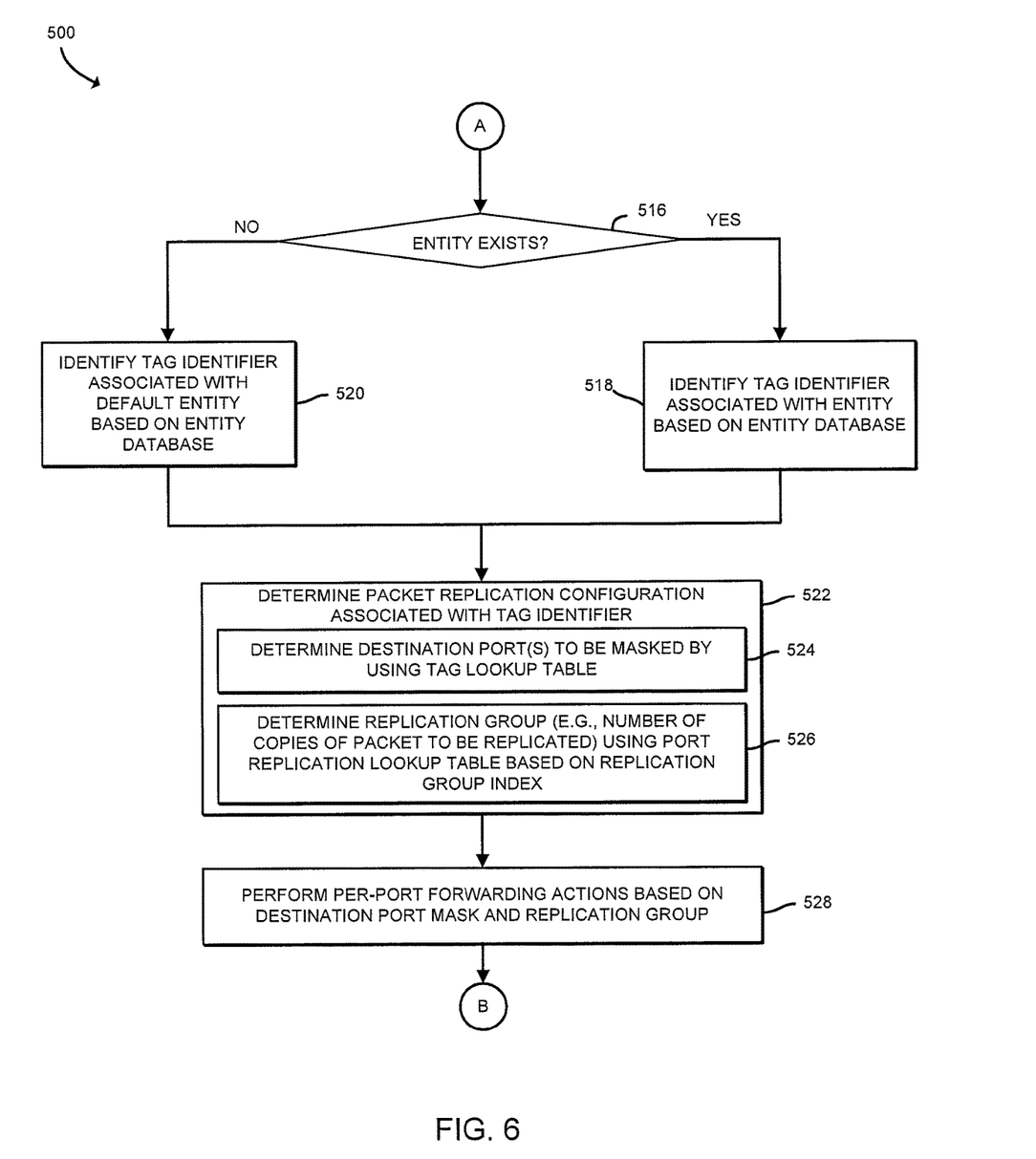

Referring now to FIGS. 5 and 6, in use, the network switch 102 may execute a method 500 for sharing packet replication resources in forwarding incoming data packets. The method 500 begins with block 502 in which the network switch 102 receives a data packet from a source compute device 104. If the network switch 102 determines that a data packet has not been received in block 504, the method 500 loops back to block 502 to continue receiving a data packet. If, however, the network switch 102 determines that a data packet has been received in block 504, the method 500 advances to block 506.

In block 506, the network switch 102 identifies an entity that is associated with the received packet. To do so, the network switch 102 may determine an entity associated with the received packet based on content of the received packet as illustrated in block 508. For example, the received packet may include an entity identifier of an entity associated with the received packet. Additionally or alternatively, in block 510, the network switch 102 may determine an entity associated with the received packet based on an incoming port of the received packet. Additionally or alternatively, in block 512, the network switch 102 may determine an entity associated with the received packet based on a media access control (MAC) address of the source compute device 104 that forwarded the received packet to the network switch 102. In other words, the network switch 102 may determine a MAC address of the source compute device 104 connected to the incoming port of the network switch 102. Additionally or alternatively, in block 514, the network switch 102 may determine an entity associated with the received packet based on one or more destination compute devices 106 that the received packet is to be forwarded to.

As described above in regard to FIGS. 3-4, in the illustrative embodiment, the entity identifiers and associated tags are predefined prior to receiving a data packet from a source computing device 104. As such, subsequent to identifying the entity associated with the received packet, the method 500 advances to block 516 in FIG. 6 to determine whether the entity identifier associated with the data packet exists. If the network switch 102 determines that the entity exists, the method 500 advances to block 518, in which the network switch 102 identifies a tag identifier associated with the identified entity based on the entity database 202.

If, however, the network switch 102 determines that the entity does not exist in block 516, a default entity is assigned, and the method 500 advances to block 520. In block 520, the network switch 102 identifies a tag identifier associated with the default entity based on the entity database 202.

Subsequently, in block 522, the network switch 102 determines a packet replication configuration associated with the tag identifier. To do so, the network switch 102 determines one or more destination ports to be masked based on the identified tag by using the tag lookup table 204 as indicated in block 524. As discussed above, the tag lookup table 204 includes mappings between the tags and one or more corresponding destination port masks. Additionally, the network switch 102 determines a replication group using the port replication lookup table 206 based on the replication group index as indicated in block 526. As discussed above, the replication group indicates a number of copies of packet to be replication to be sent out on each destination port. The port replication lookup table 206 includes mappings between the replication group indices and the corresponding replication group for each replication group index.

Subsequently, in block 528, the network switch 102 performs per-port forwarding actions based on the destination port mask(s) and the replication group associated with the tag identifier to forward the data packet received from the source computing device 104. The method 500 then loops back to block 502 to continue receiving data packets.

Examples

Illustrative examples of the technologies disclosed herein are provided below. An embodiment of the technologies may include any one or more, and any combination of, the examples described below.

Example 1 includes a network switch for sharing packet replication resources, the network switch comprising a network communicator is to receive a data packet; an entity manger is to identify an entity associated with the data packet and determine a tag associated with the entity; and a tag manager is to determine a packet replication configuration associated with the tag, and perform one or more per-port forwarding actions based on the packet replication configuration; wherein the packet replication configuration includes one or more destination ports to be masked and a number of copies to be replicated to be sent out on each destination port.

Example 2 includes the subject matter of Example 1, and wherein to identify the entity associated with the data packet comprises to determine an entity associated with the data packet based on at least one of packet content, a device that is forwarding the data packet, and one or more destination compute devices that the data packet is to be forwarded to.

Example 3 includes the subject matter of any of Examples 1 and 2, and wherein the tag is associated with multiple entities.

Example 4 includes the subject matter of any of Examples 1-3, and wherein to determine a tag associated with the entity comprises to determine whether the entity associated with the data packet exists, and to assign, in response to a determination that the entity does not exist, a default entity.

Example 5 includes the subject matter of any of Examples 1-4, and wherein the tag manager is further to determine, prior to a receipt of the data packet, whether to create a new entity; create, in response to a determination that the new entity is to be created, the new entity; define a packet replication configuration associated with the new entity; and determine whether the packet replication configuration of the new entity matches a packet replication configuration of an existing tag.

Example 6 includes the subject matter of any of Examples 1-5, and wherein the tag manager is further to associate, in response to a determination that the packet replication configuration of the new entity matches the packet replication configuration of the existing tag, the new entity with the existing tag, and create, in response to a determination that the packet replication configuration of the new entity does not match the packet replication configuration of the existing tag, a new tag associated with the new entity.

Example 7 includes the subject matter of any of Examples 1-6, and wherein the tag manager is further to determine, in response to a creation of the new entity, whether a number of existing entities exceeds a predefined threshold; and delete, in response to a determination that the number of existing entities exceeds the predefined threshold, an existing entity of the existing entities that has not been used the longest.

Example 8 includes a network switch of claim 1, wherein the tag manager is further to determine, prior to a receipt of the data packet, whether to update an existing entity; determine, in response to a determination of the existing entity to be updated, a tag associated with the existing entity; and update a packet replication configuration associated with the tag.

Example 9 includes a method for sharing packet replication resources by a network switch, the method comprising receiving, by the network switch, a data packet; identifying, by the network switch, an entity associated with the data packet; determining, by the network switch, a packet replication configuration associated with the entity; determining, by the network switch, a tag associated with the entity; determining, by the network switch, a packet replication configuration associated with the tag; and performing, by the network switch, one or more per-port forwarding actions based on the packet replication configuration; wherein the packet replication configuration includes one or more destination ports to be masked and a number of copies to be replicated to be sent out on each destination port.

Example 11 includes the subject matter of any of Examples 9 and 10, and wherein identifying the entity associated with the data packet comprises determining, by the network switch, an entity associated with the data packet based on at least one of packet content, a device that is forwarding the data packet, and one or more destination compute devices that the data packet is to be forwarded to.

Example 12 includes the subject matter of any of Examples 9-11, and wherein the tag is associated with multiple entities.

Example 13 includes the subject matter of any of Examples 9-12, and wherein determining a tag associated with the entity comprises determining whether the entity associated with the data packet exists, and assigning, in response to a determination that the entity does not exist, a default tag.

Example 14 includes the subject matter of any of Examples 9-13, and further including determining, prior to a receipt of the data packet and by the network switch, whether to create a new entity; creating, in response to a determination that the new entity is to be created and by the network switch, the new entity; defining, by the network switch, a packet replication configuration associated with the entity; and determining, by the network switch, whether the packet replication configuration of the new entity matches a packet replication configuration of an existing tag.

Example 15 includes the subject matter of any of Examples 9-14, and further including associating, in response to a determination that the packet replication configuration of the new entity matches the packet replication configuration of the existing tag, the new entity with the existing tag, and creating, in response to a determination that the packet replication configuration of the new entity does not match the packet replication configuration of the existing tag, a new tag associated with the new entity.

Example 16 includes the subject matter of any of Examples 9-15, and further including determining, in response to a creation of the new entity and by the network switch, whether a number of existing entities exceeds a predefined threshold; and deleting, in response to a determination that the number of existing entities exceeds the predefined threshold and by the network switch, an existing entity of the existing entities that has not been used the longest.

Example 17 includes the subject matter of any of Examples 9-16, and further including determining, prior to a receipt of the data packet and by the network switch, whether to update an existing entity; determining, in response to a determination of the existing entity to be updated and by the network switch, a tag associated with the existing entity; and updating, by the network switch, a packet replication configuration associated with the tag.

Example 18 includes one or more machine-readable storage media comprising a plurality of instructions stored thereon that, when executed, causes a network switch to receive a data packet; identify an entity associated with the data packet; determine a packet replication configuration associated with the entity; determine a tag associated with the entity; determine a packet replication configuration associated with the tag; and perform one or more per-port forwarding actions based on the packet replication configuration; wherein the packet replication configuration includes one or more destination ports to be masked and a number of copies to be replicated to be sent out on each destination port.

Example 19 includes the subject matter of Example 18, and wherein to identify the entity associated with the data packet comprises to determine an entity associated with the data packet based on at least one of packet content, a device that is forwarding the data packet, and one or more destination compute devices that the data packet is to be forwarded to.

Example 20 includes the subject matter of any of Examples 18 and 19, and wherein the tag is associated with multiple entities.

Example 21 includes the subject matter of any of Examples 18-20, and wherein to determine a tag associated with the entity comprises to determine whether the entity associated with the data packet exists, and assign, in response to a determination that the entity does not exist, a default tag.

Example 22 includes the subject matter of any of Examples 18-21, and further including a plurality of instructions that in response to being executed cause the network switch to determine, prior to a receipt of the data packet, whether to create a new entity; create, in response to a determination that the new entity is to be created, the new entity; define a packet replication configuration associated with the entity; and determine whether the packet replication configuration of the new entity matches a packet replication configuration of an existing tag.

Example 23 includes the subject matter of any of Examples 18-22, and further including a plurality of instructions that in response to being executed cause the network switch to associate, in response to a determination that the packet replication configuration of the new entity matches the packet replication configuration of the existing tag, the new entity with the existing tag, and create, in response to a determination that the packet replication configuration of the new entity does not match the packet replication configuration of the existing tag, a new tag associated with the new entity.

Example 24 includes the subject matter of any of Examples 18-23, and further including a plurality of instructions that in response to being executed cause the network switch to determine, in response to a creation of the new entity, whether a number of existing entities exceeds a predefined threshold; and delete, in response to a determination that the number of existing entities exceeds the predefined threshold, an existing entity of the existing entities that has not been used the longest.

Example 25 includes the subject matter of any of Examples 18-24, and further including a plurality of instructions that in response to being executed cause the network switch to determine, prior to a receipt of the data packet, whether to update an existing entity; determine, in response to a determination of the existing entity to be updated, a tag associated with the existing entity; and update a packet replication configuration associated with the tag.

The invention claimed is:

1. A network switch comprising:
circuitry to:
determine, prior to a receipt of a data packet, whether to create a new entity;
create, in response to a determination that the new entity is to be created, the new entity;
define a packet replication configuration associated with the new entity; and
determine whether the packet replication configuration associated with the new entity matches a packet replication configuration of an existing tab and
second circuitry to identify an entity associated with a received data packet and determine a tag associated with the entity and
to determine a packet replication configuration associated with the tag, and perform one or more per-port forwarding actions based on the packet replication configuration, wherein the packet replication configuration includes one or more destination ports and a number of copies to be replicated to be sent out of at least one destination port and wherein the tag is associated with multiple source entities.

2. The network switch of claim 1, wherein to identify the entity associated with the data packet comprises to determine an entity associated with the data packet based on at least one of: packet content, a device that is forwarding the data packet, and/or one or more destination compute devices that the data packet is to be forwarded to.

3. The network switch of claim 1, wherein to determine a tag associated with the entity comprises to determine whether the entity associated with the data packet exists, and to assign, in response to a determination that the entity does not exist, a default entity.

4. The network switch of claim 1, wherein the circuitry is further to:
associate, in response to a determination that the packet replication configuration of the new entity matches the packet replication configuration of the existing tag, the new entity with the existing tag, and create, in response to a determination that the packet replication configuration of the new entity does not match the packet replication configuration of the existing tag, a new tag associated with the new entity.

5. The network switch of claim 4, wherein the circuitry is further to:

determine, in response to a creation of the new entity, whether a number of existing entities exceeds a predefined threshold and delete, in response to a determination that the number of existing entities exceeds the predefined threshold, an existing entity of the existing entities that has not been used the longest.

6. The network switch of claim 1, wherein the circuitry is further to:

determine, prior to a receipt of the data packet, whether to update an existing entity;

determine, in response to a determination of the existing entity to be updated, a tag associated with the existing entity; and update a packet replication configuration associated with the tag associated with the existing entity.

7. A method for sharing packet replication resources by a network switch, the method comprising:

determining, by the network switch, prior to a receipt of a data packet, whether to create a new entity;

creating, by the network switch, in response to a determination that the new entity is to be created, the new entity;

defining, by the network switch, a packet replication configuration associated with the new entity;

determining, by the network switch, whether the packet replication configuration associated with the new entity matches a packet replication configuration of an existing tag;

receiving, by the network switch, a data packet;

identifying, by the network switch, an entity associated with the data packet;

determining, by the network switch, a packet replication configuration associated with the entity;

determining, by the network switch, a tag associated with the entity;

determining, by the network switch, a packet replication configuration associated with the tag; and performing, by the network switch, one or more per-port forwarding actions based on the packet replication configuration, wherein the packet replication configuration includes one or more destination ports and a number of copies to be replicated to be sent out of at least one destination port and wherein the tag is associated with multiple source entities.

8. The method of claim 7, wherein identifying the entity associated with the data packet comprises determining, by the network switch, an entity associated with the data packet based on at least one of: packet content, a device that is forwarding the data packet, and/or one or more destination compute devices that the data packet is to be forwarded to.

9. The method of claim 7, wherein determining a tag associated with the entity comprises determining whether the entity associated with the data packet exists, and assigning, in response to a determination that the entity does not exist, a default tag.

10. The method of claim 7 further comprising:

associating, by the network switch, in response to a determination that the packet replication configuration of the new entity matches the packet replication configuration of the existing tag, the new entity with the existing tag, and creating, by the network switch, in response to a determination that the packet replication configuration of the new entity does not match the packet replication configuration of the existing tag, a new tag associated with the new entity.

11. The method of claim 10 further comprising:

determining, by the network switch, in response to a creation of the new entity, whether a number of existing entities exceeds a predefined threshold; and deleting, by the network switch, in response to a determination that the number of existing entities exceeds the predefined threshold, an existing entity of the existing entities that has not been used the longest.

12. The method of claim 7 further comprising:

determining, by the network switch, prior to a receipt of the data packet, whether to update an existing entity;

determining, by the network switch, in response to a determination of the existing entity to be updated, a tag associated with the existing entity; and updating, by the network switch, a packet replication configuration associated with the tag associated with the existing entity.

13. One or more non-transitory machine-readable storage media comprising a plurality of instructions stored thereon that, when executed, causes a network switch to:

determine, prior to a receipt of a data packet, whether to create a new entity;

create, in response to a determination that the new entity is to be created, the new entity;

define a packet replication configuration associated with the new entity;

identify an entity associated with a received data packet;

determine a packet replication configuration associated with the entity;

determine whether the packet replication configuration associated with the new entity matches a packet replication configuration of an existing tag;

determine a tag associated with the entity;

determine a packet replication configuration associated with the tag; and perform one or more per-port forwarding actions based on the packet replication configuration, wherein the packet replication configuration includes one or more destination ports and a number of copies to be replicated to be sent out of at least one destination port and wherein the tag is associated with multiple source entities.

14. The one or more non-transitory machine-readable storage media of claim 13, wherein to identify the entity associated with the data packet comprises to determine an entity associated with the data packet based on at least one of packet content, a device that is forwarding the data packet, and one or more destination compute devices that the data packet is to be forwarded to.

15. The one or more non-transitory machine-readable storage media of claim 13, wherein to determine a tag associated with the entity comprises to: determine whether the entity associated with the data packet exists, and assign, in response to a determination that the entity does not exist, a default tag.

16. The one or more non-transitory machine-readable storage media of claim 13, further comprising a plurality of instructions that in response to being executed cause the network switch to:
- associate, in response to a determination that the packet replication configuration of a new entity matches the packet replication configuration of an existing tag, the new entity with the existing tag and
- create, in response to a determination that the packet replication configuration of the new entity does not match the packet replication configuration of the existing tag, a new tag associated with the new entity.

17. The one or more non-transitory machine-readable storage media of claim 13, further comprising a plurality of instructions that in response to being executed cause the network switch to:
- determine, in response to a creation of the new entity, whether a number of existing entities exceeds a predefined threshold and
- delete, in response to a determination that the number of existing entities exceeds the predefined threshold, an existing entity of the existing entities that has not been used the longest.

18. The one or more non-transitory machine-readable storage media of claim 13, further comprising a plurality of instructions that in response to being executed cause the network switch to:
- determine, prior to a receipt of the data packet, whether to update an existing entity;
- determine, in response to a determination of the existing entity to be updated, a tag associated with the existing entity; and
- update a packet replication configuration associated with the tag associated with the existing entity.

* * * * *